United States Patent
Rostron

(10) Patent No.: US 9,077,161 B2
(45) Date of Patent: Jul. 7, 2015

(54) INTEGRAL CURRENT TRANSFORMING ELECTRIC CIRCUIT INTERRUPTER

(71) Applicant: Joseph R. Rostron, Hampton, GA (US)

(72) Inventor: Joseph R. Rostron, Hampton, GA (US)

(73) Assignee: SOUTHERN STATES LLC, Hampton, GA (US)

( * ) Notice: Subject to any disclaimer, the term of this patent is extended or adjusted under 35 U.S.C. 154(b) by 0 days.

(21) Appl. No.: 14/104,932

(22) Filed: Dec. 12, 2013

(65) Prior Publication Data

US 2014/0160612 A1    Jun. 12, 2014

Related U.S. Application Data

(60) Provisional application No. 61/736,320, filed on Dec. 12, 2012.

(51) Int. Cl.
| | |
|---|---|
| H01H 9/28 | (2006.01) |
| H01H 27/00 | (2006.01) |
| H01H 47/00 | (2006.01) |
| H01H 63/00 | (2006.01) |
| H02B 13/035 | (2006.01) |
| H02B 5/06 | (2006.01) |
| H02H 3/00 | (2006.01) |
| H02H 9/08 | (2006.01) |
| H01H 33/02 | (2006.01) |

(52) U.S. Cl.
CPC .............. *H02B 13/0356* (2013.01); *H02B 5/06* (2013.01); *H01H 33/022* (2013.01); *H01H 33/027* (2013.01)

(58) Field of Classification Search
USPC ........................................................ 361/268
See application file for complete search history.

(56) References Cited

U.S. PATENT DOCUMENTS

| | | | | |
|---|---|---|---|---|
| 6,316,742 | B1 * | 11/2001 | Rostron et al. | 218/84 |
| D531,133 | S * | 10/2006 | McCord et al. | D13/158 |
| 2010/0193474 | A1 * | 8/2010 | Rostron et al. | 218/124 |
| 2011/0042354 | A1 * | 2/2011 | Blalock et al. | 218/29 |
| 2013/0050882 | A1 * | 2/2013 | Rostron | 361/44 |

\* cited by examiner

*Primary Examiner* — Dharti Patel
(74) *Attorney, Agent, or Firm* — Mehrman Law Office; Michael J. Mehrman

(57) ABSTRACT

An electric power switch suitable as a capacitor, line and load switch for transmission and distribution voltages includes an external actuator controlled by current transformers (CTs) mounted on live tanks comprising insulators forming dielectric containers that house the contactors of the switch. The CTs are located on the outside of the insulators in the regions of the insulators overlying the internal contactors between the upper and lower high voltage line taps. The actuator and controller may also be located outside the dielectric container, as desired. This configuration minimizes the size of the dielectric container and removes the severe size constraint inherent in design conventional "live tank" switch designs, while also avoiding the need for separate line-mounted CTs. This design also avoids the need for a separate grounded "dead tank" to house the CTs, which are more conveniently located in the outside of the insulators.

20 Claims, 6 Drawing Sheets

INTEGRAL CURRENT TRANSFORMING ELECTRIC CIRCUIT INTERRUPTER

PRIORITY CLAIM

This application claims priority to U.S. Provisional Patent Application Ser. No. 61/736,320 filed Dec. 12, 2012, entitled "Electric Power Switch with External Actuator Controlled by Current Transformers Mounted on Live Tank Insulators" which is incorporated by reference.

TECHNICAL FIELD

The present invention is directed to electric power systems and, more particularly, to an electric power switch suitable as capacitor, line and load switches, sectionalizing switches and breakers for transmission and distribution voltages with an external actuator controlled by current transformers mounted on live tank insulators housing dielectric containers.

BACKGROUND

A typical capacitor, line or load switch (e.g., high-power circuit interrupters and breakers) for transmission and distribution voltages utilize contactors located inside dielectric containers, which may be located inside the high-voltage insulators. There are three contactors, one for each high voltage phase. The dielectric containers are referred to as "dead tank" when they are grounded and "live tank" when they are ungrounded and physically located within the high-voltage electric field of the power line. In this physical location, the "live tank" dielectric container electrically floats within the high voltage electric field as part of (inside) the insulator between the high voltage line terminals. The "live tank" dielectric container has the advantage of a utilizing the pre-existing space within the insulators to house at least a portion of the switching equipment (at least the contactor) but provides only a small footprint in which to locate the equipment.

The "dead tank" dielectric container is grounded and therefore must be insulated from the high voltage power lines. While the "dead tank" configuration provides greater size flexibility, it requires the associated expense of providing a separate tank grounded from the high voltage power lines.

In both configurations, the contactors are physically driven by actuators (drive systems) that drive the contactors to open and close the switch. The drive system typically includes a sophisticated spring loaded toggle system and mechanical latches triggered by hand or an electronic control system. Current transformers are used to detect over-current situations indicating a need to open the switch, and controllers contain the intelligence to operate the actuators, communicate with local and remote facilities, and perform other functions.

In a conventional "live tank" arrangement, some (at least the contactors) or all of the switching equipment is located within the dielectric containers formed inside the hollow insulators. This configuration typically utilizes external CTs located at high voltage around the power lines with the contactor and the mechanically sophisticated actuator crammed into the small space provided by the dielectric container located inside the insulator. This present difficult design challenges, particularly as the voltages and associated sizes of the components increase. The line-mounted CTs are also expensive and, being located high up on the power lines, present installation and maintenance challenges for line workers.

In the "dead tank" switch configuration, on the other hand, a separate grounded tank is provided to house all or a portion of the switching equipment. In particular, all three phases of CTs and contactors along with the drive system may be located in the "dead tank" resulting in relatively large dielectric container. There is, therefore, a continuing need for an improved current transformer design for a high voltage electric power switch located inside a high voltage insulator.

SUMMARY OF THE INVENTION

The invention solves the problems described above through an electric power switch suitable as a capacitor, line and load switch for transmission and distribution voltages that includes an external actuator controlled by current transformers (CTs) mounted on live tanks comprising insulators forming dielectric containers that house the contactors of the switch. The CTs are located on the outside of the dielectric containers (insulators) in the regions of the insulators overlying the internal contactors between the upper and lower high voltage line taps. The actuator and controller may also be located outside the dielectric container, as desired. This configuration minimizes the size of the dielectric container may relieve size constraints inherent in certain conventional "live tank" switch designs, while also avoiding the need for separate line-mounted CTs. This design also avoids the need for a separate grounded "dead tank" to house the CTs, which are more conveniently located in the outside of the insulators.

In view of the foregoing, it will be appreciated that the present invention provides an improved high voltage switching device. The specific structures and techniques for accomplishing the advantages described above will become apparent from the following detailed description of the embodiments and the appended drawings and claims.

DETAILED DESCRIPTION OF THE EMBODIMENTS

Figure 1:
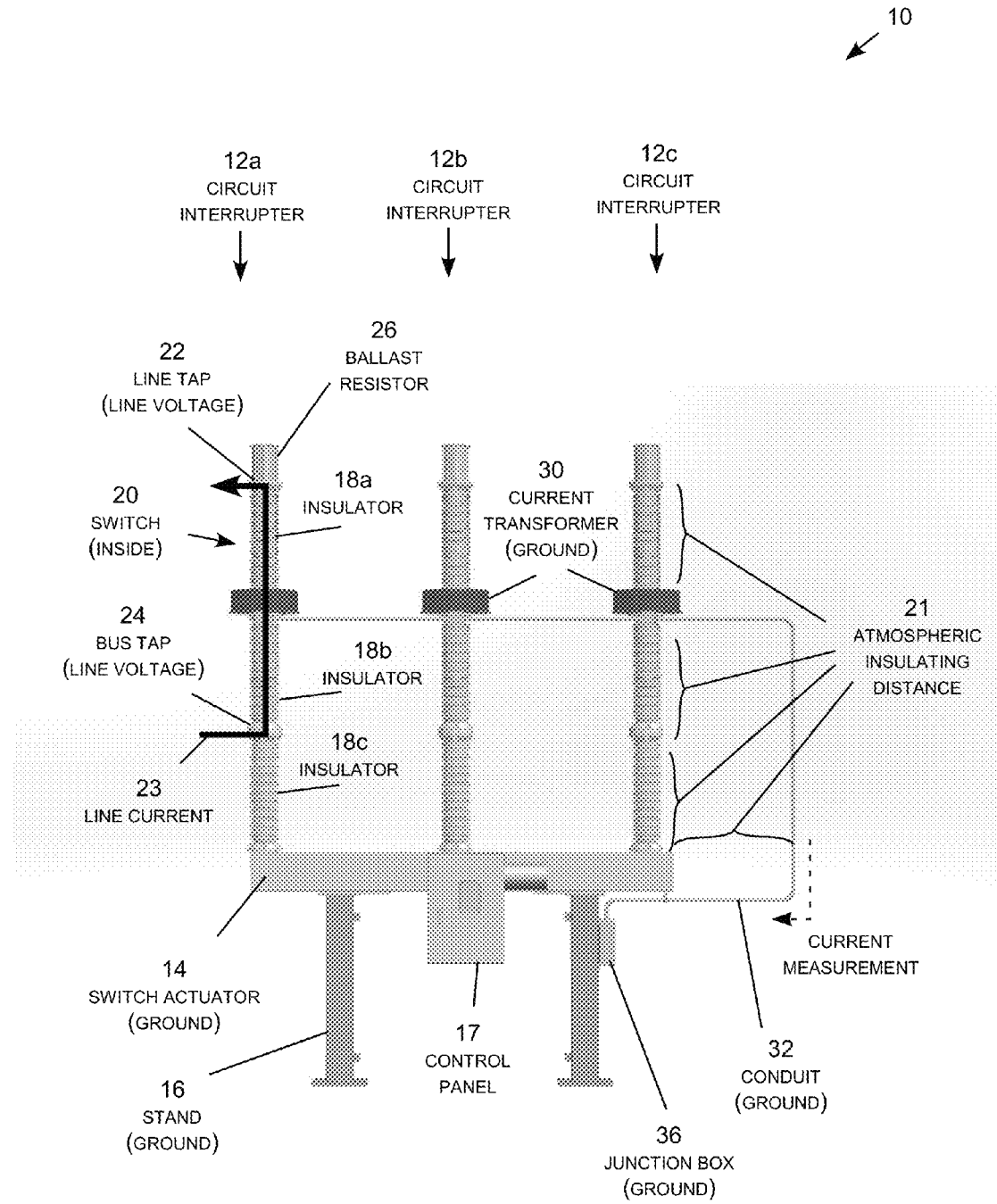
FIG. 1 is a front view of a three-phase circuit interrupter including three integral circuit interrupters with centrally mounted current transformers.

The present invention may be embodied in an integral circuit interrupter located within a high voltage insulator with an external centrally located current transformer (CT), which may be referred to as a "integral CT interrupter" as a shortened reference. Since the current transformer is grounded, a grounded conduit carrying signal wires from the current transformer to a control panel is routed around the lower high voltage line tap at a safe atmospheric insulation distance (e.g., the length of a high voltage insulator of the device). An alternative embodiment included two external current transformers centrally located on the insulator, which allows the controller to distinguish the direction and location of between faults occurring in the current transformers.

The integral CT interrupter somewhat resembles a conventional "live tank" circuit switcher while incorporating the advantages of a conventional "dead tank" design by avoiding the need for line-mounted CTs. That results in a significant improvement, with significant advantage, over conventional live tank and dead tank designs. According to the invention, the CTs are located on the outside of the dielectric containers (insulators) in the region overlying the internal contactors between the two (e.g., upper and lower) line potential terminals. Normally "live tank" switches utilize external line-mounted CTs, while only "dead tank" switch configurations avoid the need for line-mounted CTs. This integral CT interrupter avoids the need for line-mounted CTs while retaining the advantages conventionally associated with "live tank" switches, such as locating the contactors within dielectric containers located inside the insulators, while also avoiding the drawbacks conventionally associated with "dead tank" switches, such as the need for a separate grounded dielectric container.

Conventional line-mounted CTs are insulated with epoxy or oil, which can cause the CT to explode when exposed to certain types of faults. The CT in the integral CT design, on the other hand, is effectively insulated by the dielectric gas inside the insulator, which avoids the need for a separate insulation medium for the CT while eliminating the potential explosion hazard present with line-mounted CTs. Another significant benefit of the integral CT interrupter is that the foot print required to install the improved switch device is comparatively quite small, about one-third that of conventional "dead tank" devices that include CTs, contactors and actuator located inside the grounded dielectric container. The new design also generates the power output necessary for conventional protection schemes used by the electric utilities. This allows retrofit of existing circuit switchers that do not have current transformers to have these current measuring devices retrofitted without changing foundations. A second benefit is that since the design is mechanically simple, the cost is significantly less than conventional "dead tank" breakers, which are significantly more complicated and need to be that way because of their design.

The switch actuator enclosure housing the mechanical linkage and support stand provides the mechanical support for the interrupter columns and the connection linkage between the actuator and the contactors. The controller relay (controller) may be located within either of the enclosures shown, within another local enclosure, in a control room for the substation typically located some tens away, or remotely through a SCADA or other suitable communication system, as desired. In a typical installation, the controller may be located in a local control box mounted on to the actuator enclosure or located within the actuator enclosure. The controller typically includes a protection relay (or three phase relays) where the wires from the CT's initially connect to the controller. The protection relay may be located within the control box, the actuator cabinet or another location as a matter of design choice. The CT wires typically connect directly to the protection relays, which drive contacts, which may control the actuator directly or via an electronic processor connected to the relay. The relay or the associated processor then determines if there is a condition requiring a change of state in the contactors and, when this happens, closes a contact to operate the actuator. The control wires return to the switching device from this relay to control the operation of the actuator and hence the position of the contactor.

The integral CT interrupter design applies not only to line and load circuit switchers designed for relatively infrequent sectionalizing operations during fault isolation, but also to breakers used primarily for emergency over-current protection in emergency fault conditions, as well as reactor switching and capacitor switching devices used relatively frequently for power factor control and voltage support during normal system operation.

FIG. 1 is a front view of a three-phase circuit interrupter 10 including three integral circuit interrupters 12a-c with centrally mounted current transformers where each circuit interrupter is connected in series to a respective phase line. The circuit interrupters 12a-c are supported by a switch actuator 14 on a stand 16. Although the circuit interrupter may conceptually be oriented in any direction, the circuit interrupter is shown in the usual upright orientation where a line conductor is connected neat the top, a bus conductor is connected in the middle, and the switch stands on a grounded switch actuator at the bottom. A control panel 17 is typically attached to the switch actuator but may be located elsewhere if desired. The circuit interrupter 10 may be operated manually or electrically, locally or remotely, and typically has functionality for several operating modes. The circuit interrupter 10 may be configured to operate at any of wide range of transmission and distribution voltages suitable for switching with a contactor located within a dielectric container inside a high voltage insulator. A 27 kV embodiment is shown in FIG. 1 as a typical illustrative example.

Figure 2:
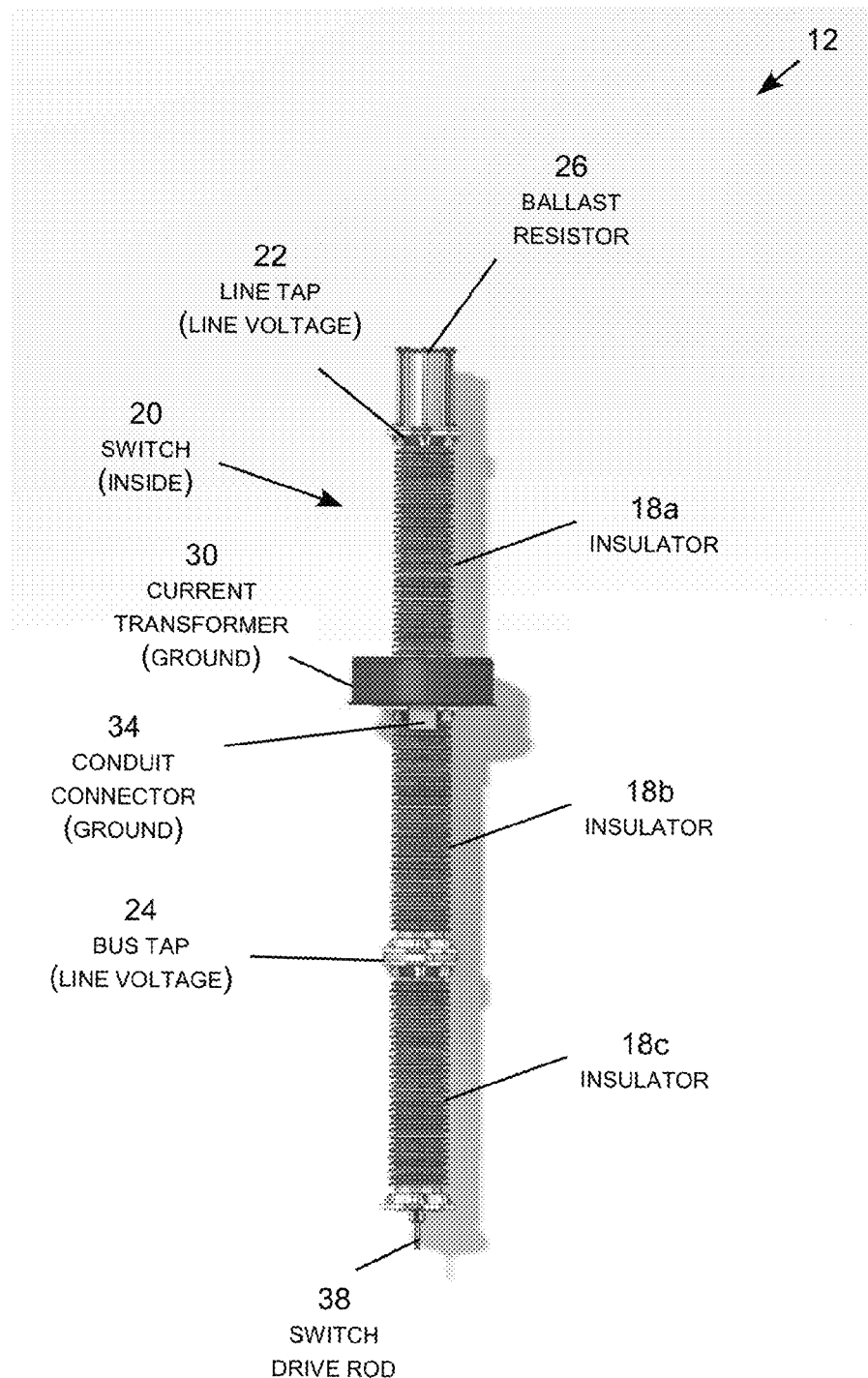
FIG. 2 is a front view of one of the circuit interrupters.

The circuit interrupters 12a-c are similar and will be referred to as a single circuit interrupter 12 for descriptive convenience. Common elements of the circuit interrupter 12 may be labeled and enumerated on different single-phase circuit interrupters shown in FIG. 1 to avoid cluttering the figure. FIG. 2 is a front view of one of the circuit interrupters. The circuit interrupter 12 includes three integrally aligned high voltage insulators 18a-c with a switch 20 located within a dielectric container formed inside the insulators. The insulators are approximately the same length with the length sufficient to safely insulate components at high voltage line to electric ground through the open atmosphere at the designed operating voltage, which will be referred to as the atmospheric insulating distance 21. A switch drive rod 38 extends from the actuator 14 through the insulators 18b-c and a portion of Insulator 18a to the location of the moving contact (typically the female contact of a penetrating contactor). The drive rod operates the switch by translating the moving contact typically with a spring loaded toggle mechanism or another suitable actuator 14 as will be understood by those skilled in electric power distribution technology.

The circuit interrupter 12 selectively conducts a line current 23 from a first high voltage referred to in this particular embodiment the line tap 22 located at the top of insulator 18a. The circuit interrupter conducts the line current a second high voltage tap referred to in this particular embodiment to the bus tap 24 located at the junction between insulators 18a and 18b. In this embodiment, the insulator 18c is located on the bottom of the insulator stack and stands on top of the switch actuator 14. This particular circuit interrupter includes a ballast resistor 26 located above the line tap 22 that is temporarily entered into the circuit connection through the interrupter on the opening and closing strokes to dampen current spikes and suppress transients. The switch mechanism may be conventional except as specifically described below and further details not required to enable the inventive features of the embodiments will therefore not be described.

A current transformer 30 (CT) is located external to the insulators at the junction between the insulators 18a and 18b. The current transformer is grounded, as is a conduit 32 that carries signal wires from the CT to a destination location, which in this example is a junction box 38 located near the control panel 17. The insulator 18a maintains the atmospheric insulating distance 21 between the line tap 22 (line voltage)

and the current transformer 30 (ground voltage); the insulator 18b maintains the atmospheric insulating distance 21 between the current transformer 30 (ground voltage) and the bus tap 24 (line voltage); and the insulator 18c maintains the atmospheric insulating distance 21 between the bus tap 24 (line voltage) and the switch actuator 14 (ground voltage). The grounded conduit 32 is routed at the level of the current transformers and then around the bottom portion of the circuit interrupter to the junction box 36 while maintaining the atmospheric insulating distance 21 between the conduit 32 and the line taps.

Figure 3:
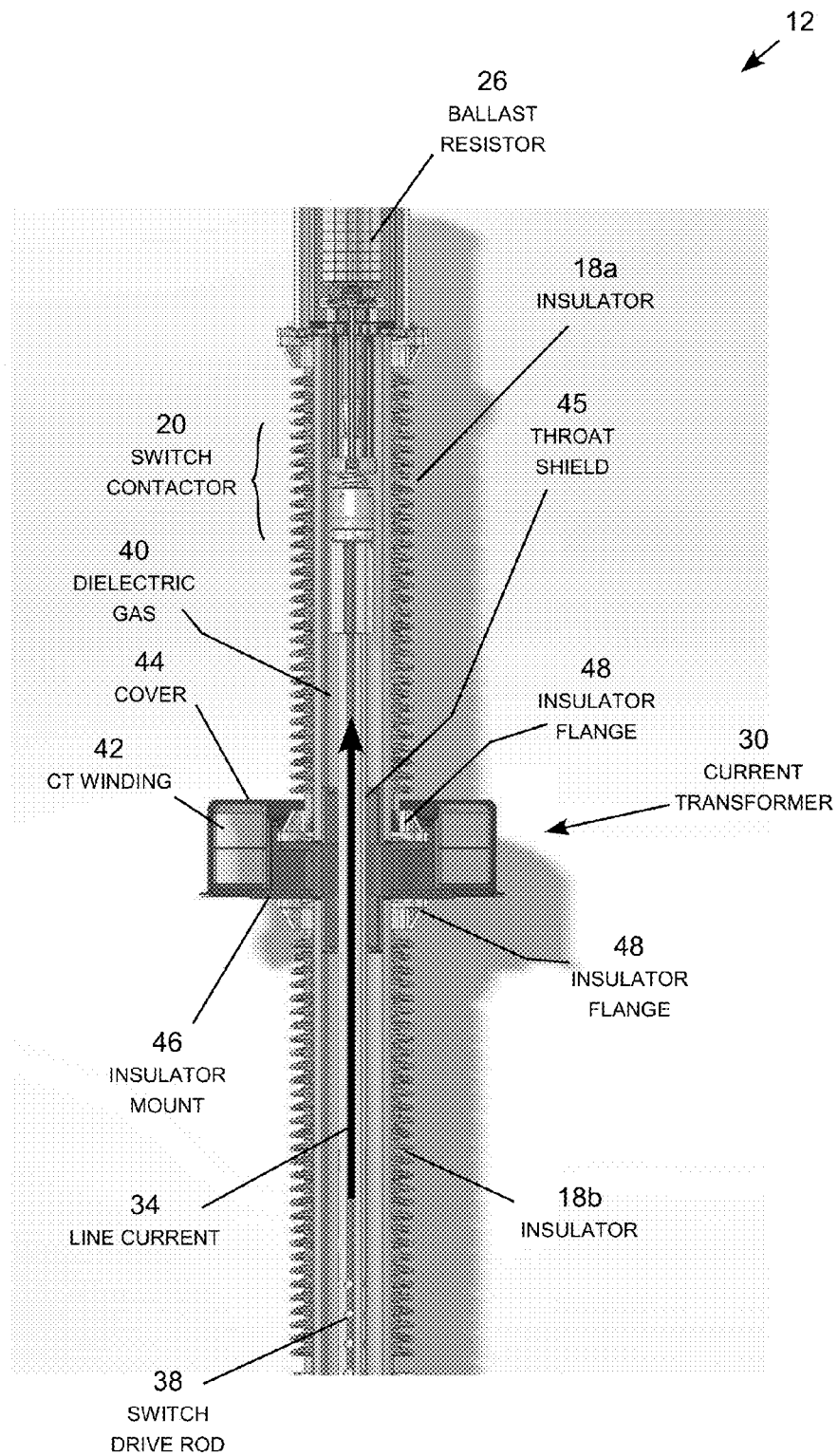
FIG. 3 is a sectional view of the circuit interrupter.

FIG. 3 is a sectional view of the circuit interrupter 12. The drive rod 38 translates a moving contact, typically a female contact of a penetrating contactor as is well known in power distribution. When the switch is closed, the line current 34 flows on the switch drive rod 38 with the power generally flowing from the bus tap 24 to the line tap 22. The insulators 18a-c define an internal sealed container filled with a dielectric gas 40, such as SF6 or another suitable dielectric medium. The dielectric gas 40 serves to safely insulate the drive rod 38 at line voltage from the insulators 18a-c to prevent a short or flash-over when power is flowing through the switch. The dielectric gas 40 therefore insulates the current transformer 30 (ground voltage) located outside the insulators from the energized drive rod 38 (line voltage).

The current transformer 30 includes a CT winding 42, which may optionally include several windings with one or more winding normally energized and one or more winding serving as spare reserve. The CT winding 42 is located within a cover 44 and is supported by an insulator mount 46 configured to bolt to insulator flanges 48 on the ends of the insulator 18a-b. The cover 44 and insulator mount 46 of the CT are maintained at electrical ground with the dielectric gas inside the container insulating the insulator mount from the drive rod at line voltage. A throat shield 45 is located inside the dielectric container adjacent to the CT insulator mount 46 to shape the electric and magnetic fields that arise in the region of the insulator mount to suppress field concentrations and avoid flashover as is known in the field of power distribution technology. The insulator mount 46 is normally constructed from a non-magnetizing material, such as plastic, stainless steel, or aluminum, to avoid interfering with magnetic coupling between the power flowing on the drive rod 38 and the CT winding 42.

Figure 4:
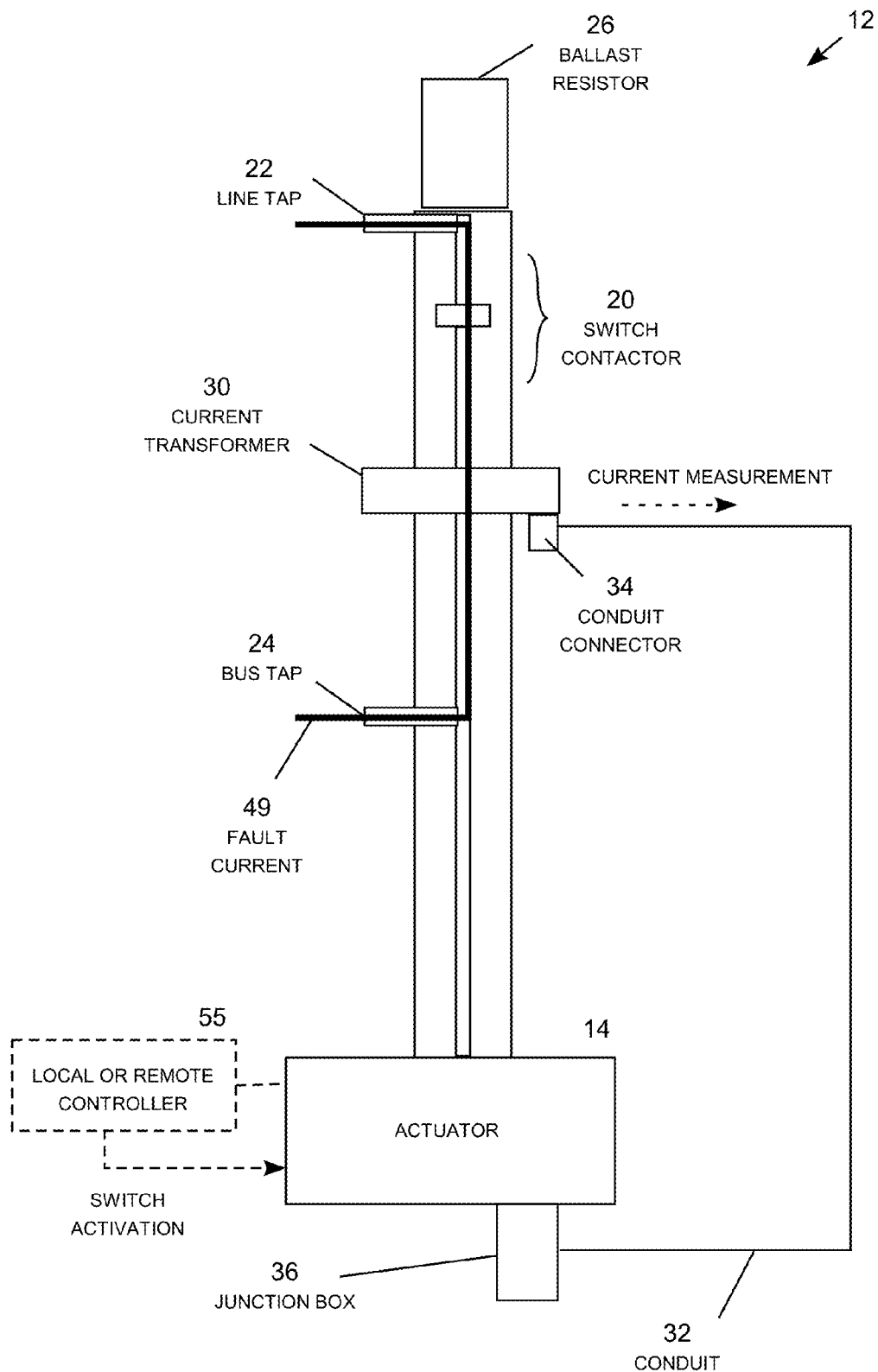
FIG. 4 is a schematic diagram of the circuit interrupter.

FIG. 4 is a schematic diagram of the circuit interrupter 12 with similar elements enumerated as described previously with reference to FIGS. 1-3. FIG. 4 also shows a local or remote controller 55, which is typically located entirely or partially within the control panel 17 shown in FIG. 1. The controller 55 is configured to operate the switch based at least in part based on the current measurements received from the CTs 30 via the conduit 32. The controller 55 may communicate the current measurements with a remote central control station using suitable communication equipment, such as SCADA. The switch may therefore be configured to operate based on locally obtained current measurements, control signals from a remote location, or both. As one example, the switch may be configured to automatically open one or more phase circuits in response to a fault condition detected by monitoring the current measurements obtained from the CTs 30. As additional example, the switch may be configured to switch a capacitor bank or voltage regulator into or out of the circuit based on the current measurements obtained from the CTs 30. The switching decision may be determined locally, remotely, in with a combination of local and remote logic. Other operational uses of the switch will become apparent to those skilled in the technology as a matter of design choice and application.

Figure 5:
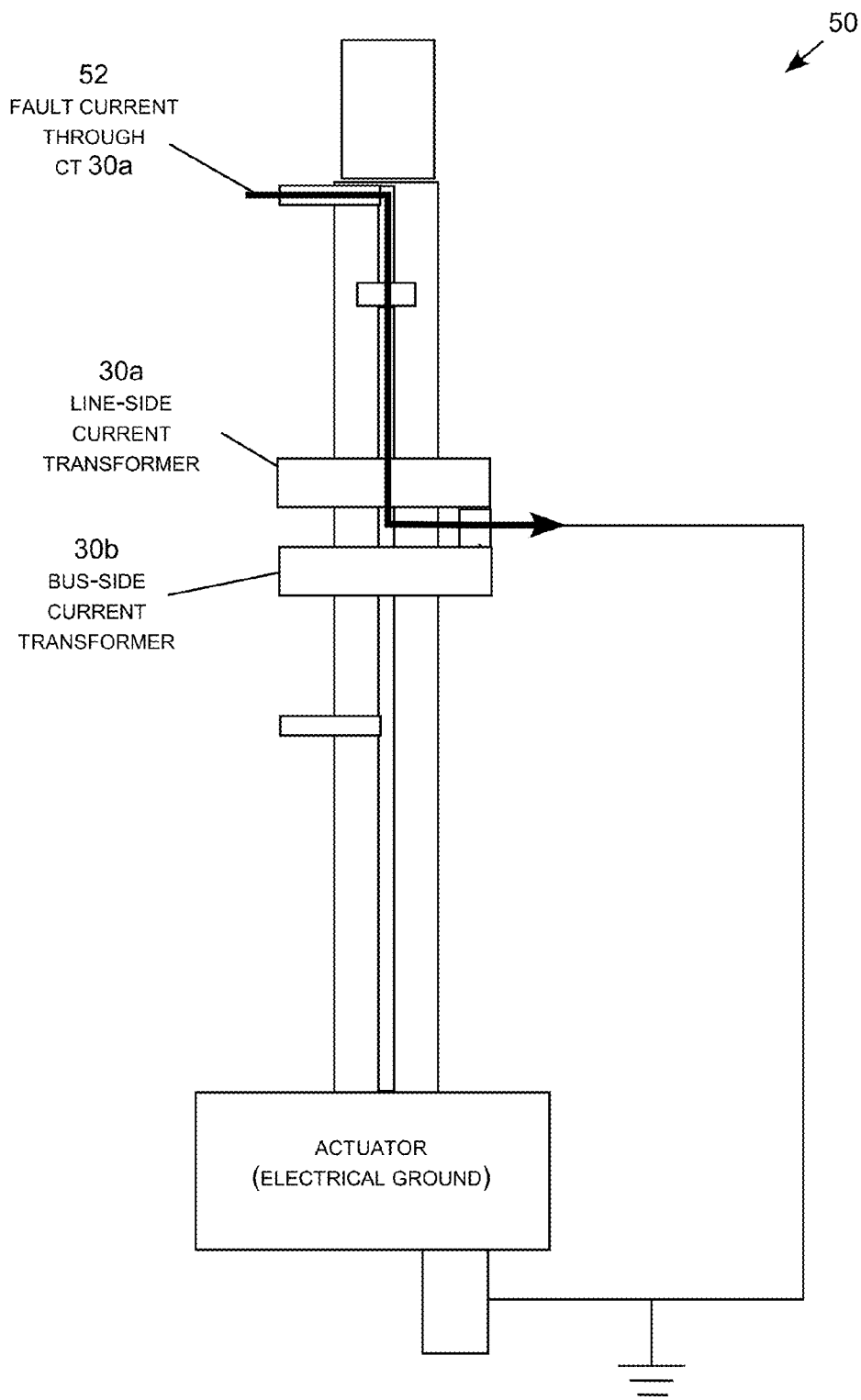
FIG. 5 is a schematic diagram of and alternate circuit interrupter with two centrally mounted current transformers showing a first fault current path.

FIG. 5 is a schematic diagram of and alternate circuit interrupter 50 that includes two centrally mounted current transformers 30a-b with a ground connection, in this example the conduit 32, located between the CTs. In this example, the current transformer 30a is located closer to the line tap above the ground connection, while the current transformer 30b is located closer to the line bus tap below the ground connection. This allows a controller analyzing the current measurements from the CTs to be able to determine the location of electric faults occurring within the CTs and the direction faults occurring elsewhere in the circuit. The dual-CT configuration shown in FIG. 5 also allows the controller to determine which CT incurred a fault. For example, FIG. 5 shows a first fault current 52 that occurs when the CT 30a incurs the fault. In this situation, the CT 30a closest to the line tap measures the fault current 52, while the CT 30b closest to the bus tap does not see the fault current 52.

Figure 6:
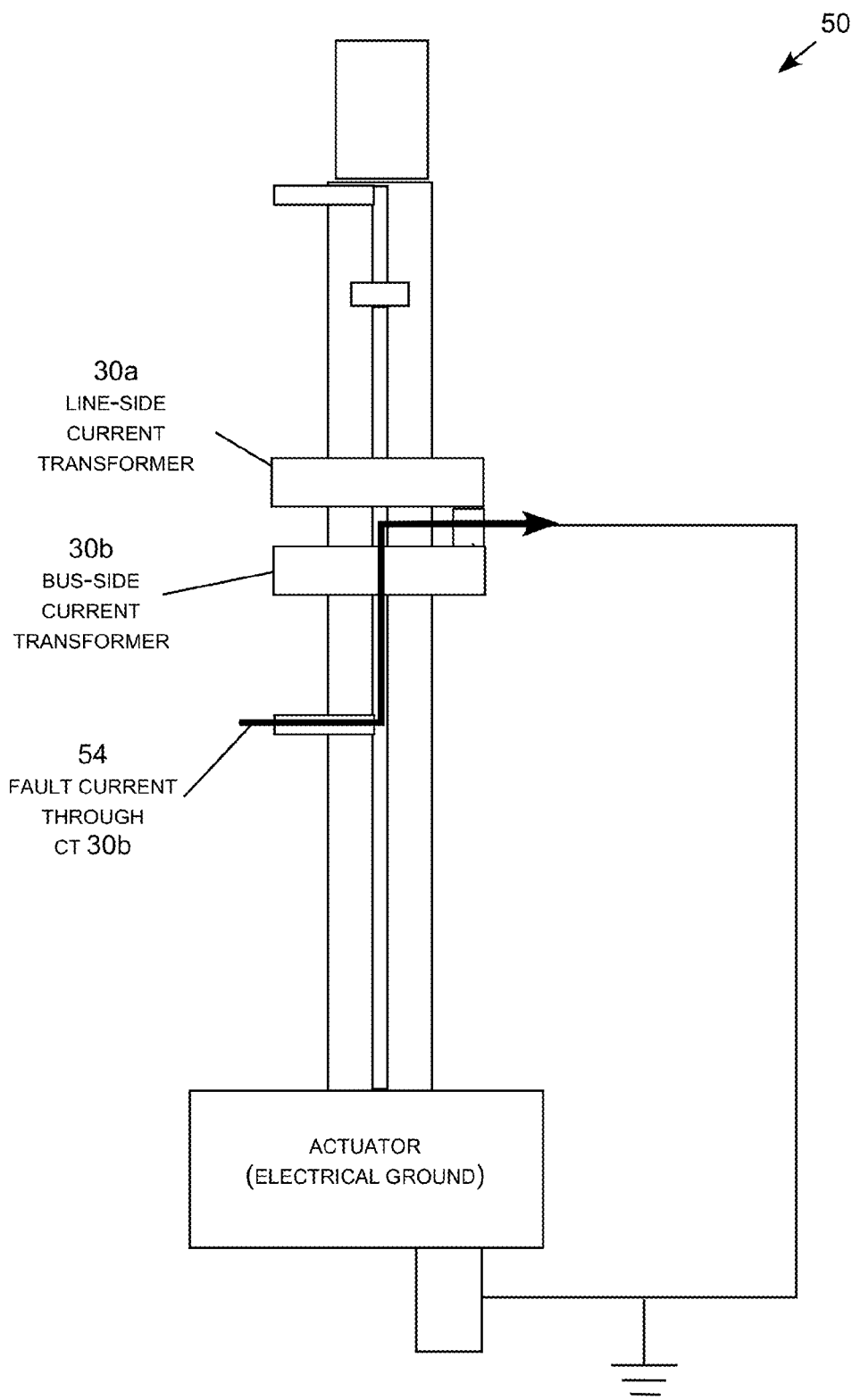
FIG. 6 is a schematic diagram of the alternate circuit interrupter showing a second fault current path.

FIG. 6 is a schematic diagram of the alternate circuit interrupter 110 showing a second fault current path 54 through the second CT 30a. In this situation, the CT 30b closest to the bus tap measures the fault current 54, while the CT 30a closest to the line tap does not see the fault current 52.

It will be further understood that the foregoing describes a preferred embodiment of the invention and that many adjustments and alterations will be apparent to those skilled in the art within the spirit and scope of the invention as defined by the appended claims.

The invention claimed is:

1. A system including a high voltage electric power switch and a current transformer supported by the switch designed for an operating voltage, comprising: a high voltage insulator having first, second and third elongated insulator sections, each insulator section having a first end and a second end, the insulator sections being aligned integrally in an end-to-end configuration;

the first insulator section having a first high voltage line tap at its first end and a first current transformer (CT) flange at its second end, the second insulator section having a second CT flange at its first end and a second high voltage line tap at its second end, and the third insulator section having the second high voltage line tap at its second end and an electrical ground connection at its second end;

the insulator sections each having a length defining an atmospheric insulating distance sufficient to insulate the operating voltage from electric ground through ambient atmosphere;

a sealed container extending inside the high voltage insulator filled with a dielectric gas;

an electric switch contact located within the sealed container comprising a stationary contact, a moving contact, and a drive rod connected to the moving contact and extending past the electrical ground connection of the third insulator, wherein the drive rod is configured for connection to a switch actuator located beyond the ground connection of the third insulator;

the switch configured to conduct an electric power line current between the first and second line taps when the stationary contact is in electrical contact with the moving contact to complete an electric power circuit through the switch;

a CT located outside the high voltage insulator at the junction between the first and second CT flanges and positioned to inductively monitor the line current flowing between the switch, the CT having a cover maintained at electrical ground;
a conduit maintained at electric ground housing signal wires extending from the CT to a grounded destination point, wherein the conduit is routed through a path in the ambient atmosphere that maintains at least the atmospheric insulating distance between the conduit and the first and second high voltage line taps.

2. The system of claim 1, wherein the CT further comprises an insulator mount attached between the first and second CT flanges and a CT winding positioned adjacent to the insulator mount.

3. The system of claim 2, wherein the insulator mount of the CT comprises a non-magnetizing material to avoid interfering with magnetic coupling between the line current and the CT winding.

4. The system of claim 3, wherein the insulator mount of the CT forms a portion of the sealed container filled with the dielectric gas.

5. The system of claim 4, further comprising a throat shield inside the sealed container adjacent to the insulator mount of the CT to shape electric and magnetic fields arising in the region of the insulator mount to suppress field concentrations and avoid flashover.

6. The system of claim 1, wherein the CT is positioned adjacent to the drive rod.

7. The system of claim 1, wherein the high voltage electric power switch and current transformer forms a first phase switch assembly configured for connection to a first phase conductor of a three-phase power line, further comprising second and third phase switch assemblies connected respectively to second and third phase conductors of the three-phase power line.

8. The system of claim 7, wherein the three phase switch assemblies and configured for attachment to a common switch actuator supported by a stand.

9. The system of claim 8, wherein the common switch actuator and the stand are maintained at electric ground.

10. The system of claim 1, further comprising a controller configured to operate the switch based on a fault condition detected by monitoring the current measurements obtained with the CT.

11. The system of claim 1, further comprising a remote controller configured to operate the switch based at least in part on the current measurements obtained with the CT.

12. A system including a high voltage electric power switch and a current transformer supported by the switch designed for an operating voltage, comprising:
a high voltage insulator having first, second and third elongated insulator sections, each insulator section having a first end and a second end, the insulator sections being aligned integrally in an end-to-end configuration;
the first insulator section having a first high voltage line tap at its first end and a first current transformer (CT) flange at its second end, the second insulator section having a second CT flange at its first end and a second high voltage line tap at its second end, and the third insulator section having the second high voltage line tap at its second end and an electrical ground connection at its second end;
the insulator sections each having a length defining an atmospheric insulating distance sufficient to insulate the operating voltage from electric ground through ambient atmosphere;
a sealed container extending inside the high voltage insulator filled with a dielectric gas;
an electric switch contact located within the sealed container comprising a stationary contact, a moving contact, and a drive rod connected to the moving contact and extending past the electrical ground connection of the third insulator, wherein the drive rod is configured for connection to a switch actuator located beyond the ground connection of the third insulator;
the switch configured to conduct an electric power line current between the first and second line taps when the stationary contact is in electrical contact with the moving contact to complete an electric power circuit through the switch;
a first CT located outside the high voltage insulator at the junction between the first and second CT flanges and positioned to inductively monitor the line current flowing between the switch, the CT having a cover maintained at electrical ground;
a second CT located outside the high voltage insulator at the junction between the first and second CT flanges and positioned to inductively monitor the line current flowing between the switch, the CT having a cover maintained at electrical ground;
a conduit maintained at electric ground housing signal wires extending from a location between the first and second CTs to a grounded destination point, wherein the conduit is routed through a path in the ambient atmosphere that maintains at least the atmospheric insulating distance between the conduit and the first and second high voltage line taps.

13. The system of claim 12, wherein:
the first CT is positioned to detect a first fault current involving the first CT in an electrical path to ground while the second CT is positioned so that it will not detect the first fault current; and
the second CT is positioned to detect a second fault current involving the second CT in an electrical path to ground while the first CT is positioned so that it will not detect the second fault current.

14. The system of claim 12, wherein the high voltage electric power switch and current transformer forms a first phase switch assembly configured for connection to a first phase conductor of a three-phase power line, further comprising second and third phase switch assemblies connected respectively to second and third phase conductors of the three-phase power line.

15. The system of claim 14, wherein the three phase switch assemblies and configured for attachment to a common switch actuator supported by a stand.

16. The system of claim 12, wherein the common switch actuator and the stand are maintained at electric ground.

17. The system of claim 12, further comprising a controller configured to operate the switch based on a fault condition detected by monitoring the current measurements obtained with the CT.

18. The system of claim 12, further comprising a controller configured to operate the switch based on detection of a fault current by monitoring the current measurements obtained with the CTs.

19. The system of claim 12, further comprising a remote controller configured to operate the switch based on detection of a fault current by monitoring the current measurements obtained with the CTs.

20. A method for operating an electric power switch, comprising:
providing a high voltage insulator having first, second and third elongated insulator sections, each insulator section having a first end and a second end, the insulator sections being aligned integrally in an end-to-end configuration;

the first insulator section having a first high voltage line tap at its first end and a first current transformer (CT) flange at its second end, the second insulator section having a second CT flange at its first end and a second high voltage line tap at its second end, and the third insulator section having the second high voltage line tap at its second end and an electrical ground connection at its second end;

the insulator sections each having a length defining an atmospheric insulating distance sufficient to insulate the operating voltage from electric ground through ambient atmosphere;

providing a sealed container extending inside the high voltage insulator filled with a dielectric gas;

providing an electric switch contact located within the sealed container comprising a stationary contact, a moving contact, and a drive rod connected to the moving contact and extending past the electrical ground connection of the third insulator, wherein the drive rod is configured for connection to a switch actuator located beyond the ground connection of the third insulator;

connecting the switch to conduct an electric power line current between the first and second line taps when the stationary contact is in electrical contact with the moving contact to complete an electric power circuit through the switch;

positioning a first CT located outside the high voltage insulator at the junction between the first and second CT flanges and positioned to inductively monitor the line current flowing between the switch, the CT having a cover maintained at electrical ground;

positioning a second CT located outside the high voltage insulator at the junction between the first and second CT flanges and positioned to inductively monitor the line current flowing between the switch, the CT having a cover maintained at electrical ground;

connecting a conduit maintained at electric ground housing signal wires extending from a location between the first and second CTs to a grounded destination point, wherein the conduit is routed through a path in the ambient atmosphere that maintains at least the atmospheric insulating distance between the conduit and the first and second high voltage line taps; and detecting a fault current involving one of the CTs by detecting a difference between current measurements obtained from the CTs.

\* \* \* \* \*